(12) United States Patent
Hsieh et al.

(10) Patent No.: US 8,049,673 B2
(45) Date of Patent: Nov. 1, 2011

(54) ELECTRONIC DEVICE AND MULTI-FREQUENCY ANTENNA THEREOF

(75) Inventors: Po-Chuan Hsieh, Taipei Hsien (TW);
Yu-Chang Pai, Taipei Hsien (TW);
Hsiao-Yun Su, Taipei Hsien (TW);
Chien-Hung Liu, Taipei Hsien (TW);
Jia-Chi Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 385 days.

(21) Appl. No.: 12/475,512

(22) Filed: May 30, 2009

(65) Prior Publication Data

US 2010/0283697 A1    Nov. 11, 2010

(51) Int. Cl.
*H01Q 13/00*    (2006.01)
(52) U.S. Cl. ......................................................... 343/767
(58) Field of Classification Search .................. 343/767, 343/702, 700 MS, 770, 846
See application file for complete search history.

(56) References Cited

U.S. PATENT DOCUMENTS

| | | | | |
|---|---|---|---|---|
| 5,945,954 A | * | 8/1999 | Johnson | 343/702 |
| 6,710,748 B2 | * | 3/2004 | Yarasi et al. | 343/702 |
| 6,741,214 B1 | * | 5/2004 | Kadambi et al. | 343/700 MS |
| 2009/0262028 A1 | * | 10/2009 | Mumbru et al. | 343/702 |
| 2011/0156975 A1 | * | 6/2011 | Pros et al. | 343/767 |

* cited by examiner

*Primary Examiner* — Huedung Mancuso
(74) *Attorney, Agent, or Firm* — Altis Law Group, Inc.

(57) ABSTRACT

An electronic device includes a multi-frequency antenna. The multi-frequency antenna includes a ground portion, a support body, a radiation portion, and a strap. The ground portion defines a gap, and two grooves communicating with the gap and located at opposite ends of the gap. The radiation portion resists against a sidewall bounding the gap, and is connected to the strap. The radiation portion is accommodated in the gap and substantially coplanar with the ground portion. The radiation portion defines a slot. The support body is located in the gap and on the radiation portion, to support the strap.

13 Claims, 5 Drawing Sheets

ELECTRONIC DEVICE AND MULTI-FREQUENCY ANTENNA THEREOF

BACKGROUND

1. Technical Field

The present disclosure relates to electronic devices and multi-frequency antennas, and particularly to an electronic communications device and a multi-frequency antenna provided in the electronic communications device for receiving and transmitting wireless signals.

2. Description of Related Art

Recently, communications devices, such as mobile telephones or a notebook computers, have become common. Such a communications device is generally provided with an antenna for transmitting and receiving wireless signals. Ordinarily, this antenna is a miniature antenna that can be located in the casing of the communications device for convenience in carrying. However, due to the decreasing size of the antenna, transmission quality of the wireless signals may be declined, construction of the antenna may become complicated, and low return loss requirements in the antenna may not be met.

DETAILED DESCRIPTION

Figure 1:
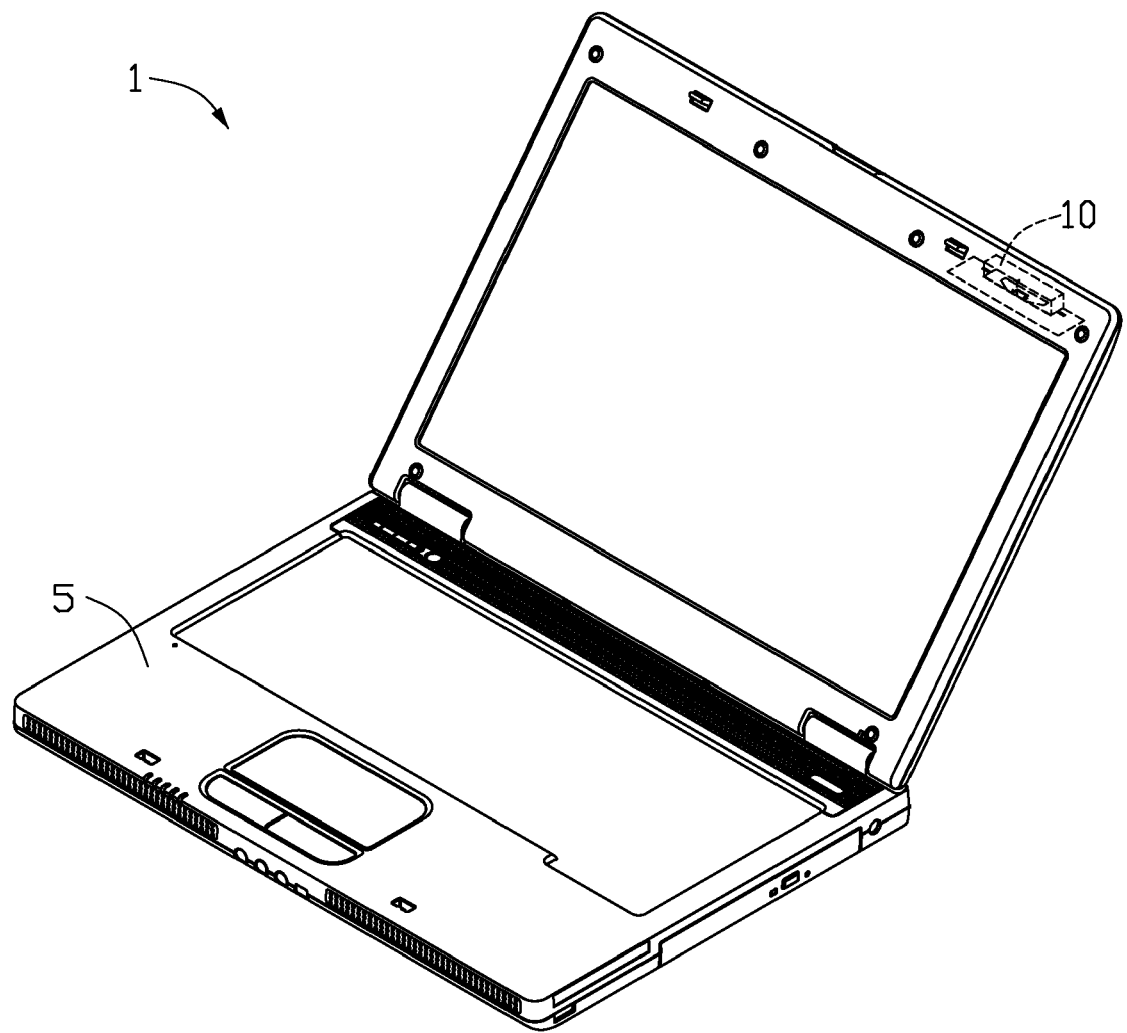
FIG. 1 is a schematic, isometric view of an exemplary embodiment of an electronic device.
Figure 2:
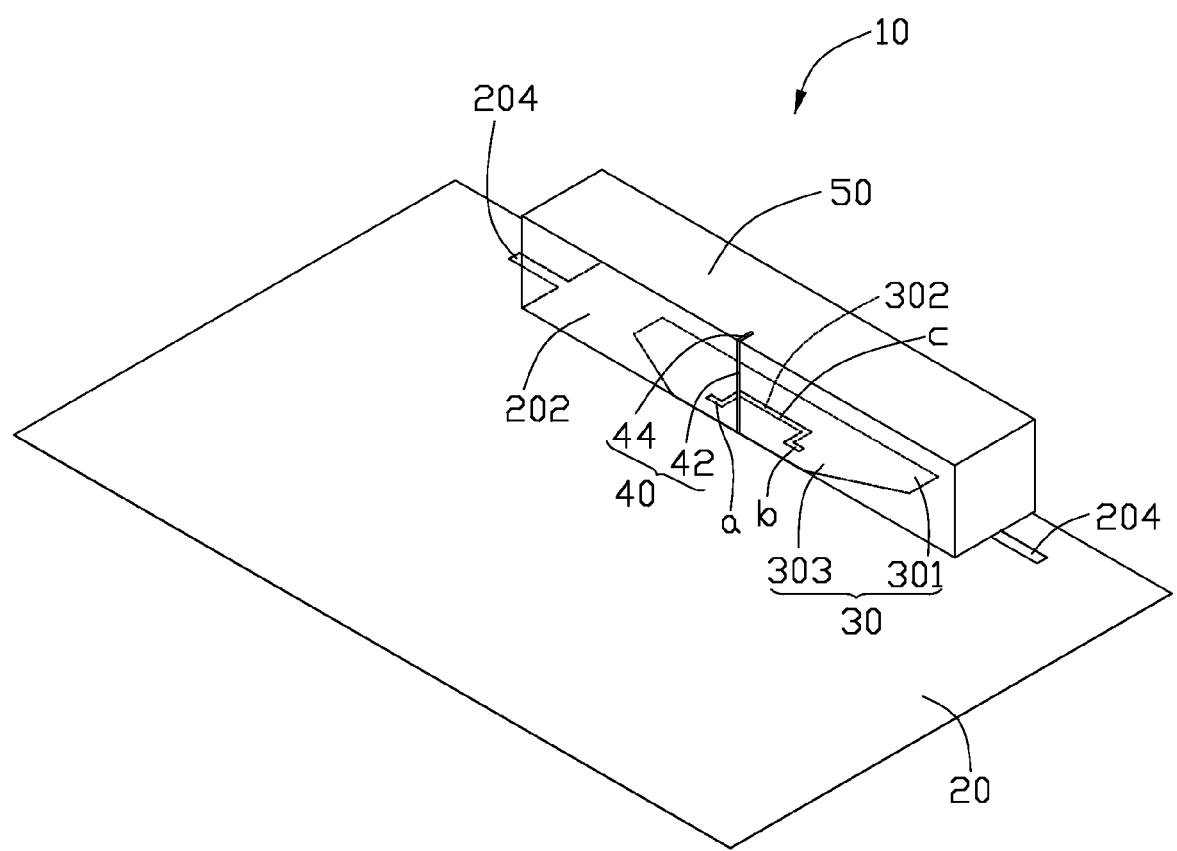
FIG. 2 is a schematic, isometric view of an exemplary embodiment of a multi-frequency antenna.

Referring to FIGS. 1 and 2, an exemplary embodiment of an electronic device 1 is disclosed includes a main body 5 and a multi-frequency antenna 10 arranged in the main body 5. The multi-frequency antenna 10 is to receive and transmit wireless signals, to communicate between the electronic device 1 and other wireless electronic devices. The electronic device 1 can be a notebook computer, a mobile phone, or another portable device.

The multi-frequency antenna 10 includes a ground portion 20, a radiation portion 30, a strap 40, and a support body 50. The ground portion 20, the radiation portion 30, and the strap 40 can, for example, be pasted to the support body 50.

The ground portion 20 can be made of copper or other metals, and is connected to a receiving terminal (not shown) of the main body 5. One side of the ground portion 20 defines a rectangular gap 202 for receiving the radiation portion 30. The ground portion 20 also defines two rectangular grooves 204, communicating with the gap 202 and located at opposite ends of the gap 202, for adjusting frequencies of the received and transmitted signals. In one embodiment, a length of the gap 202 can be 84 mm, a width of the gap 202 can be 15.5 mm, a length of the groove 204 can be 8 mm, and a width of the groove 204 can be 2 mm.

The radiation portion 30 can be made of copper or other metals, and is to receive and transmit the wireless signals. The radiation portion 30 is substantially coplanar with the ground portion 20, and includes a rectangular body 301 and a trapezoid-shaped protrusion 303 extending from a side of the body 301. A first side of the protrusion 303 opposite to the body 301 resists against a sidewall bounding the gap 202 of the ground portion 20, and is connected to the strap 40. The radiation portion 30 defines a slot 302, for adjusting frequencies of the transmitted and received signals. The slot 302 includes a first portion c parallel to the first side of the protrusion 303, and two L-shaped second portions a, b vertically extending from opposite ends of the first portion c. In one embodiment, a length of the body 301 of the radiation portion 30 can be 53.5 mm, a width of the body 301 can be 5.35 mm, a length of the first side of the protrusion 303 can be 25.5 mm, a length of a second side communicating with the side of the body 301 of the protrusion 303 can be 53.5 mm, a height of the protrusion 303 can be 6.47 mm, a length of one segment connected to the first portion c of each of the second portions a, b can be 4.5 mm, a length of the other segment parallel and opposite to the first portion c of each of the second portions a, b can be 3 mm, and a length of the first portion c can be 14 mm.

The strap 40 made of copper or other metals resists against the support body 50, to receive and transmit signals. The strap 40 includes a vertical connection portion 42 connected to the protrusion 303 of the radiation portion 30, and a horizontal connection portion 44 perpendicularly extending from a distal end of the vertical connection portion 42. In one embodiment, a length of the vertical connection portion 42 can be 15.5 mm, and a length of the horizontal connection portion 44 can be 2.75 mm.

The support body 50 is rectangular and made of plastic or other materials. An area of a bottom surface of the support body 50 can be substantially equal to an area of the gap 202. The support body 50 is located in the gap 202 and on the radiation portion 30, and supports the strap 40. In one embodiment, a length and a width of the support body 50 can be equal to the length and the width of the gap 202 respectively, and a height of the support body 50 can be 15.5 mm.

Figure 3:
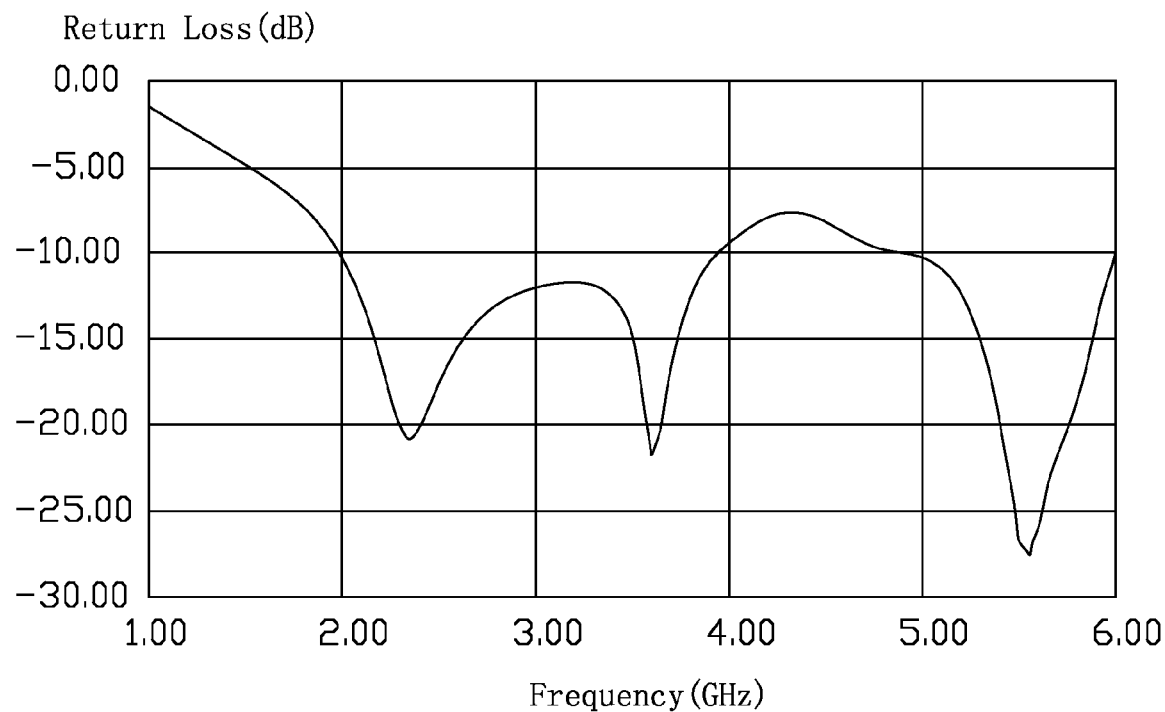
FIG. 3 is a diagram showing a test result of return loss of the multi-frequency antenna of FIG. 2.

When the multi-frequency antenna 10 transmits signals, some signals may be reflected back, to cause return loss of the transmitting signals. When the multi-frequency antenna 10 receives signals, some signals may be reflected back, again to cause return loss of the receiving signals. FIG. 3 shows testing the signal return loss when the multi-frequency antenna 10 transmits and receives different frequency signals. The signal return loss of three bands 2.3 GHz-2.7 GHz, 3.4 GHz-3.8 GHz, and 5.15 GHz-5.8 GHz (specifications of short distance communication wireless fidelity (WIFI) are 2.3-2.7 GHz and 5.15-5.8 GHz, specifications of long distance communication worldwide interoperability for microwave access (WIMAX) are 2.3-2.7 GHz and 3.4-3.8 GHz) received and transmitted by the multi-frequency antenna 10 are less than −10 dB. Currently, the signal return loss less than −10 dB represents a good performance of a multi-frequency antenna. Therefore, the test proves that the multi-frequency antenna 10 has good performance and can be applied to WIFI and WIMAX communications.

Figure 4:
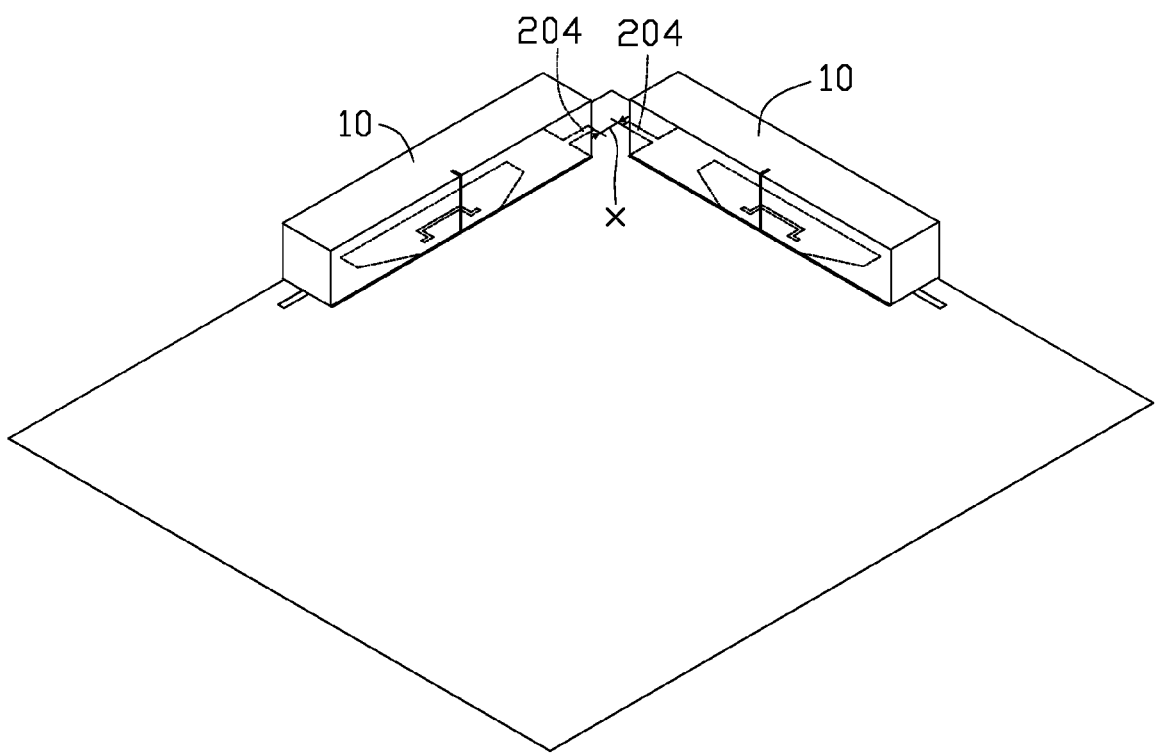
FIG. 4 is a schematic, isometric view of two multi-frequency antennas in testing crosstalk effect.
Figure 5:
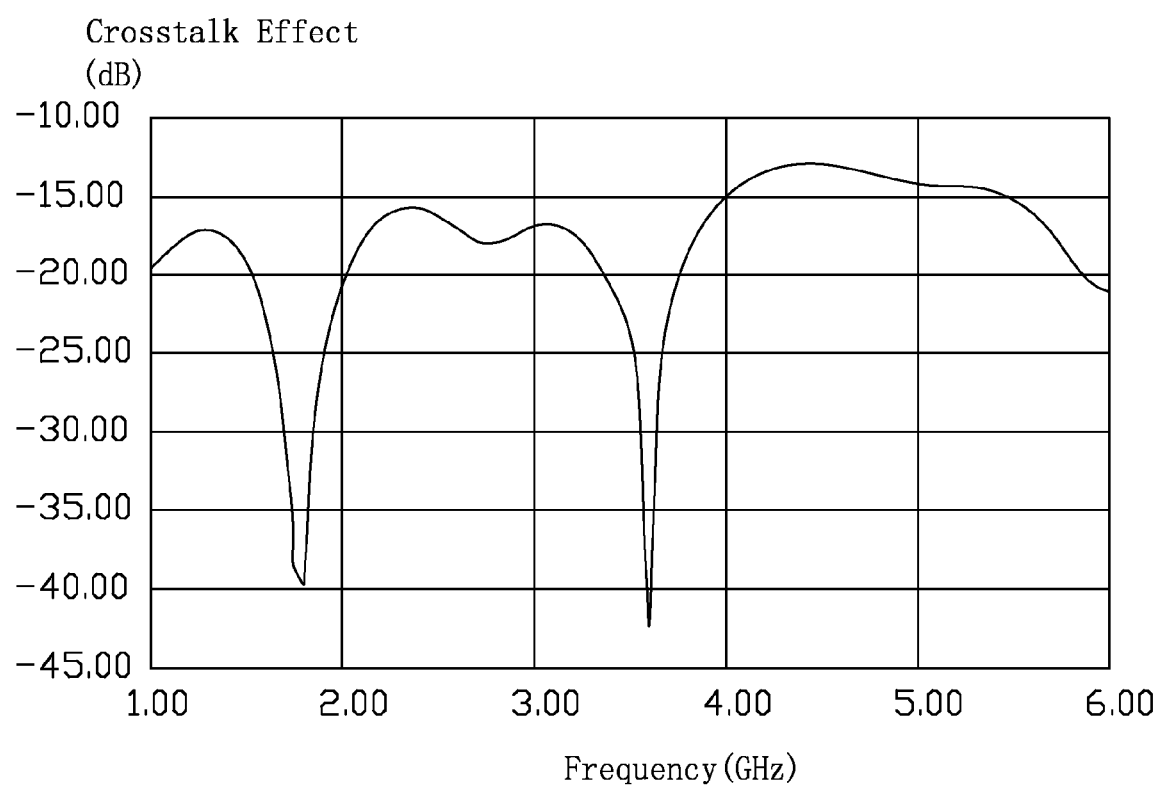
FIG. 5 is a diagram showing a test result of FIG. 4.

FIG. 4 shows how to test signal crosstalk effect when a distance x between two grooves 204 of two adjacent multi-frequency antennas 10 is about 2 mm. When the two multi-frequency antennas 10 transmit and receive signals, different signals may be disturbed to cause the crosstalk effect. FIG. 5 shows that the signal crosstalk effects of three bands 2.3 GHz-2.7 GHz, 3.4 GHz-3.8 GHz and 5.15 GHz-5.8 GHz received and transmitted by the multi-frequency antenna 10 are less than −10 dB. Currently, the signal crosstalk effect less than −10 dB represents a good performance of a multi-frequency antenna. Therefore, the test proves that the multi-frequency antenna 10 has a good performance regarding crosstalk can be applied to WIFI and WIMAX communications.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. An electronic device, comprising:
a multi-frequency antenna, comprising:
a ground portion defining a gap, and two grooves communicating with the gap and located at opposite ends of the gap;
a strap;
a radiation portion accommodated in the gap and substantially coplanar with the ground portion, wherein a side of the radiation portion resists against a sidewall bounding the gap, wherein the radiation portion is connected to the strap, and defines a slot; and
a support body located in the gap and on the radiation portion, to support the strap.

2. The device of claim 1, wherein the strap comprises a vertical connection portion connected to the radiation portion, and a horizontal connection portion perpendicularly extending from a distal end of the vertical connection portion, wherein the horizontal connection portion is supported on the support body.

3. The device of claim 1, wherein the gap and the grooves are all rectangular, a length and a width of the gap are 84 mm and 15.5 mm respectively, and a length and a width of each groove are 8 mm and 2 mm respectively.

4. The device of claim 1, wherein the ground portion, the radiation portion, and the strap are all made of copper.

5. The device of claim 1, wherein the radiation portion comprises a rectangular body and a trapezoid-shaped protrusion extending from a side of the body, wherein a first side of the protrusion opposite to the body resists against the sidewall bounding the gap of the ground portion, and is connected to the strap, a length of the body is 53.5 mm, a width of the body is 5.35 mm, a length of the first side of the protrusion is 25.5 mm, a length of a second side communicating with the side of the body of the protrusion is 53.5 mm, and a height of the protrusion is 6.47 mm.

6. The device of claim 5, wherein the slot comprises a first portion parallel to the first side of the protrusion of the radiation portion, and two L-shaped second portions vertically extending from opposite ends of the first portion, a length of one segment connected to the first portion of each of the second portions is 4.5 mm, a length of the other segment parallel and opposite to the first portion of each of the second portions is 3 mm, and a length of the first portion is 14 mm.

7. The device of claim 1, wherein the support body is made of plastic and is rectangular.

8. The device of claim 1, wherein a length of the support body is 84 mm, and a width and a height of the support body are 15.5 mm.

9. A multi-frequency antenna, comprising:
a ground portion defining a gap, and two grooves communicating with the gap and located at opposite ends of the gap;
a radiation portion accommodated in the gap and resisting against a sidewall bounding the gap via a side of the radiation portion, wherein the radiation portion is substantially coplanar with the ground portion, and defines a slot;
a strap electrically connected to the side of the radiation portion with a first end of the strap; and
a support body located on the ground portion and covering the gap, wherein a second end opposite to the first end of the strap is supported on the support body.

10. The antenna of claim 9, wherein the strap comprises a vertical connection portion connected to the radiation portion and a horizontal connection portion perpendicularly extending from a distal end of the vertical connection portion.

11. The antenna of claim 9, wherein the gap and the grooves are all rectangular, a length and a width of the gap are 84 mm and 15.5 mm respectively, and a length and a width of each groove are 8 mm and 2 mm respectively.

12. The antenna of claim 9, wherein the radiation portion comprises a rectangular body and a trapezoid-shaped protrusion extending from a side of the body, a first side of the protrusion opposite to the body functions as the side of the radiation portion to resist against the sidewall bounding the gap of the ground portion, and is connected to the strap, wherein a length of the main body is 53.5 mm, a width of the body is 5.35 mm, a length of the first side of the protrusion is 25.5 mm, a length of a second side communicating with the side of the body of the protrusion is 53.5 mm, and a height of the protrusion is 6.47 mm.

13. The antenna of claim 12, wherein the slot comprises a first portion parallel to the first side of the protrusion of the radiation portion, and two L-shaped second portions vertically extending from opposite ends of the first portion, a length of one segment connected to the first portion of each of the second portions is 4.5 mm, a length of the other segment parallel and opposite to the first portion of each of the second portions is 3 mm, and a length of the first portion is 14 mm.

* * * * *